March 11, 1947. T. HINDMARCH 2,417,198
POWER DRIVE
Filed April 6, 1943 2 Sheets-Sheet 1
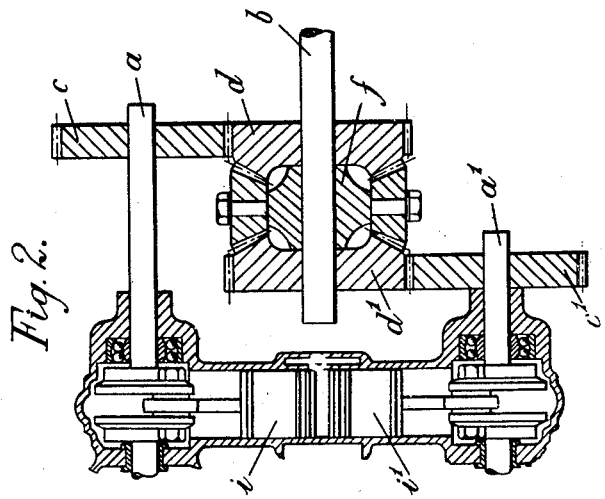
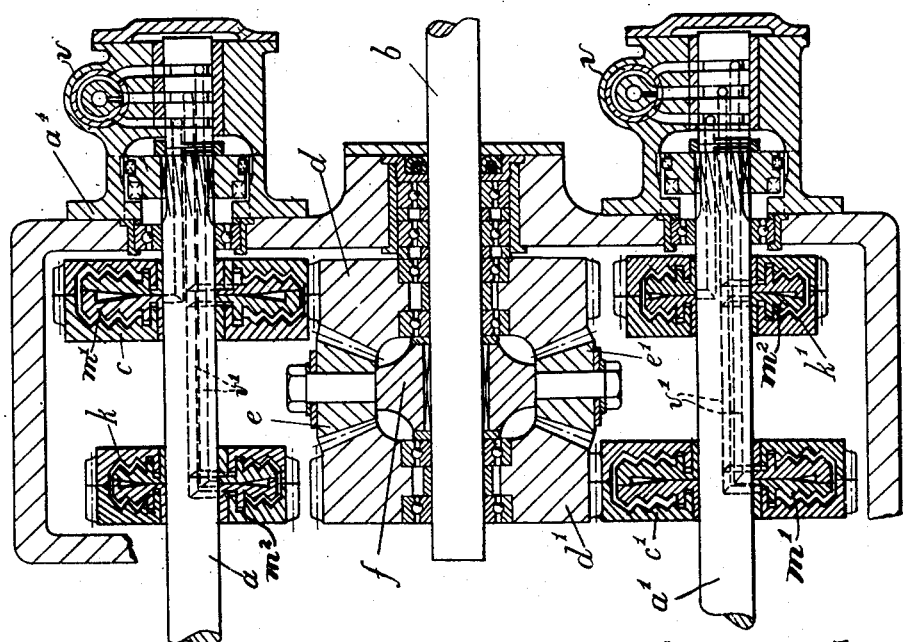
Inventor
T. Hindmarch Patented Mar. 11, 1947

2,417,198

UNITED STATES PATENT OFFICE 2,417,198

POWER DRIVE

Thomas Hindmarch, London S. W. 1, England

Application April 6, 1943, Serial No. 482,018
In Great Britain March 2, 1942

3 Claims. (Cl. 74—282)

This invention relates to power drives applicable generally, but particularly designed for the driving of tanks, locomotives, rail cars and other land vehicles and tractors, for aircraft, for marine propulsion, and for the winding engines of collieries, or for steel rolling machinery.

The object of the present invention is to devise an improved power drive which will materially reduce the possibility of the vehicle or the like as a whole being rendered useless in the event of damage to the motive power, will enable repairs or adjustments to be readily made to the motive power while permitting the vehicle or the like to continue to function, will enable high power Diesel or other engines to be provided with two or more crankshafts, and will possess other advantages hereinafter referred to.

The invention consists in a power drive comprising an output shaft and a plurality of prime movers or prime mover units geared thereto through the medium of a differential or differentials.

The invention also consists in a power drive according to the preceding paragraph having automatic means for preventing wastage of power by reverse driving of one prime mover by another in the event of the first being put out of operation either deliberately or by accident.

Further features of the invention will be apparent from the description given hereafter.

The accompanying drawings illustrate several modes of carrying out the invention.

Figure 1 is a sectional elevation showing the invention applied to two prime movers.

Figure 2 shows the invention applied to the opposed piston engine, and

Figure 3:
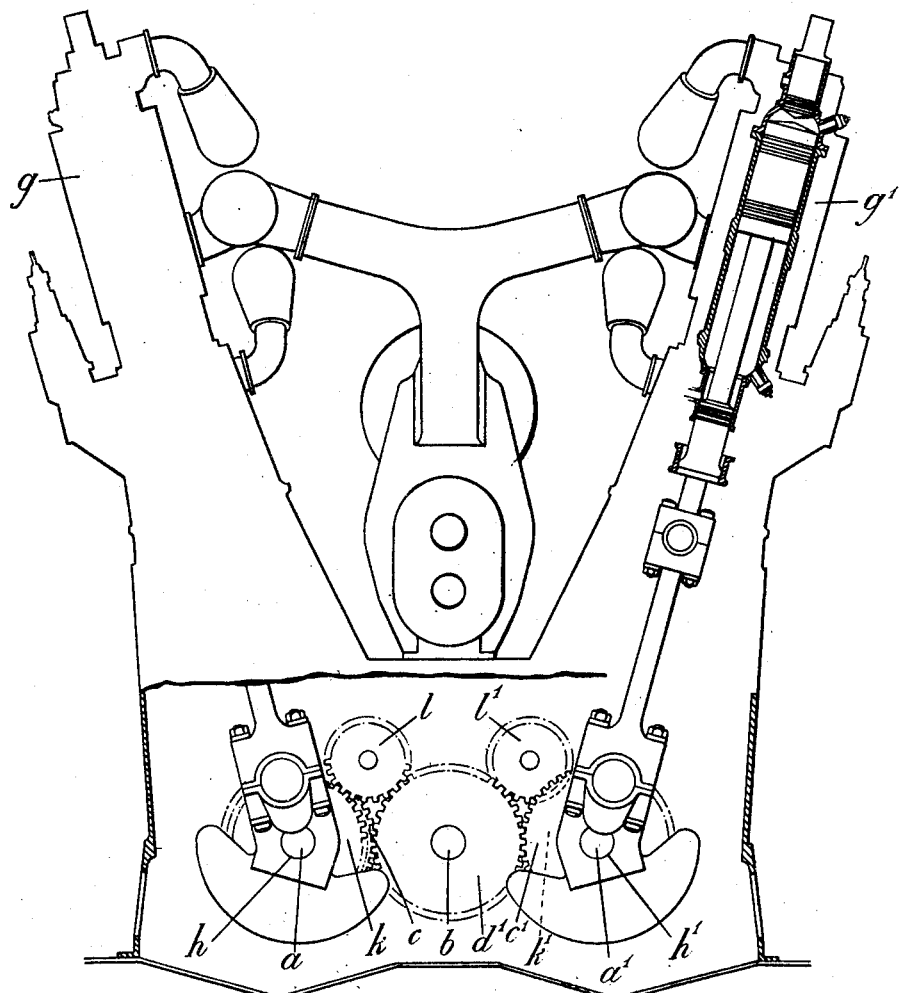
Figure 3 shows the invention applied to a twin crankshaft engine.

In carrying my invention into effect in one of its simplest forms as shown in Figure 1 I provide two engines or other prime movers (not shown) having their driving shafts $aa'$ parallel to one another and parallel to and on opposite sides of a driven or output shaft $b$. Each of the prime mover driving shafts carries a spur wheel $cc'$ and these engage respectively with spur wheels formed with, or driving, bevel wheels $dd'$ adapted to mesh with two bevel pinions $ee'$ carried by a spider $f$ keyed to the output shaft $b$, the bevel wheels and bevel pinions thus constituting a simple differential arrangement. The arrangement is such that if the spur wheels $cc'$ driven by the two prime movers are making the same number of revolutions then the drive from the two prime movers is transmitted solidly to the output shaft $b$ which will revolve at engine speed, assuming all the spur wheels to be similar. If, however, there is a difference between the two engine speeds then the output shaft will revolve at the mean speed and in the extreme case if one engine is stopped altogether the output shaft will continue to revolve at one-half engine speed. Thus in the event of break-down of one engine the vehicle or the like to which the power drive is applied could continue to run and fulfill all specified functions at one-half speed while the other engine is being repaired. The invention, therefore, is of particular utility in the case of heavy tanks and generally it will be seen that the arrangement possesses the following advantages:

(1) The vehicle or the like can continue to function if one prime mover is knocked out and the same can in the meantime be repaired if such repairs can be carried out in situ.

(2) The prime movers may be run alternately enabling cooling off and engine alterations to be made.

(3) When slow speed only is required the drive may be made by one engine only run at the most economical speed.

(4) The arrangement would be of considerable value in marine work as it would enable the vessel to be run at the most economical speed at the most economical engine speed reserving the use of both engines for full speed.

The principles of the invention may be readily applied to a high power Diesel or other engine in which it is desirable to provide two crankshafts. For example, in a V-type engine as shown in Figure 3, each bank of cylinders $gg'$ would have its own crankshaft $hh'$, and these would be geared to a common output shaft $b$ by a differential arranged as above described.

Again, an opposed piston type of steam or other engine as shown in Figure 2, may have each piston $ii'$ or each group of corresponding pistons connected to a separate crankshaft $aa'$, as is usual, and the two crankshafts would be connected to a common output shaft $b$ by a similar differential arrangement to that described with reference to Figure 1, and parts of which are similarly lettered. Such a device is particularly suitable for aircraft.

With one engine or unit stopped there would normally be a tendency for such engine or unit to be driven in reverse by the running engine or unit thus resulting in wastage of power and I obviate this by introducing suitable automatic means for preventing such reverse driving of either of the engines. In one convenient manner of effecting this and as indicated in Figure 1, I may provide upon each input shaft a portion $a^2$ cut with splines slightly inclined to the axis and these are adapted to engage with the internal splining of a sliding dog clutch $a^3$. The clutch is free to revolve in the same direction as the input shaft but is prevented from revolving in the opposite direction by ratchet pawls engaging with a fixed housing $a^4$ and the arrangement is such that as soon as the input shaft commences to turn in the direction opposite to its driving direction the sliding dog slides along the shaft and engages with fixed dogs thus preventing the shaft from turning. The pawls and fixed dogs are normally in alignment so as to ensure easy and certain engagement and disengagement. When the stopped engine or unit is again put into commission and as soon as the input torque exceeds the applied torque from the other engine or unit the shaft will commence to turn in its driving direction and the sliding dog is automatically disengaged and the pawls thrown into operation by centrifugal action.

As it is necessary to overcome the torque from the running engine when starting up the second engine it is desirable to throttle down until both engines are running properly and thereafter the throttles may be adjusted to any practical requirements.

In cases where drive of the output shaft both ahead and astern is required this may easily be obtained by fitting additional pinions $kk'$ (Figures 1 and 3) to the input shafts with idlers $ll'$ (Figure 3) engaging with such pinions and with the spur wheels of the differential and suitable fluid operated clutches $m^1$ and $m^2$ selectively operable by valve means V controlling the flow of fluid through conduits $V^1$ (Figure 1) may be employed for selecting the particular drive for the time being required.

By suitable choice of gear ratios reduction to any extent can be obtained and in the case of large power drives (for example in heavy marine work) it may be desirable to use an epicyclic differential.

It will be understood, however, that the invention extends broadly to the driving of a single output shaft from two or more prime movers or prime mover units while securing synchronisation by the use of a differential or differentials. The invention is, therefore, not to be limited to the foregoing details which are given purely by way of example, and the invention is equally applicable with compression ignition and other internal combustion engines, steam engines, turbines, electric motors, and other prime movers.

It is not necessary that the prime movers of any particular installation should be identical in character nor is it necessary that they should be of the same power but where prime movers of different powers are used to drive a single output shaft it would be preferable to arrange the gearing so that the torques upon the bevels of the differential are approximately equal.

I claim:

1. A power drive of the kind referred to comprising a plurality of prime movers or prime mover units each with its driving shaft arranged parallel to a common output shaft disposed between the said driving shafts, a carrier fast on said output shaft and carrying the planetary wheels of a differential, a pair of sun wheels loose on the ouput shaft and engaging said planetary wheels, a gear loosely mounted on each of said driving shafts meshing directly with the respective sun wheels for driving the output shaft in one direction, a second gear loosely mounted on each driving shaft meshing indirectly with the respective sun wheels for driving the output shaft in the reverse direction, pressure fluid operating clutches for coupling the gears to the driving shafts according as the output shaft is to be driven in one direction or the other, and means for selectively operating the clutches whereby the output shaft may be driven in either direction without altering the direction of rotation of the driving shafts.

2. A power drive according to claim 1 having on each driving shaft automatic means for preventing reverse driving of one prime mover by another in the event of the first being put out of operation either deliberately or by accident.

3. A power drive according to claim 1 having a portion of each input shaft cut with splines slightly inclined to the axis of said shaft; a dog clutch slidably mounted on said splined portion and free to revolve in the same direction as the input shaft, a one-way clutch preventing rotation of the dog clutch in a direction opposite to the direction of rotation of the input shaft, and a fixed dog adjacent said sliding dog, the arrangement being such that as soon as the input shaft commences to turn in the direction opposite to its driving direction the sliding dog will automatically be moved into engagement with the fixed dog thus preventing rotation of said shaft in said reverse direction.

THOMAS HINDMARCH.

REFERENCES CITED

The following references are of record in the file of this patent:

UNITED STATES PATENTS

| Number | Name | Date |
|---|---|---|
| 1,076,416 | Gammeter | Oct. 21, 1913 |
| 1,076,632 | Gammeter | Oct. 21, 1913 |
| 1,108,422 | Barnum | Aug. 25, 1914 |
| 1,130,054 | Barnum | Mar. 2, 1915 |
| 1,519,309 | Hummel | Dec. 16, 1924 |
| 1,684,162 | Trumpler | Sept. 11, 1928 |
| 1,689,751 | Rengler | Oct. 30, 1928 |
| 1,696,836 | Bushyager | Dec. 25, 1928 |
| 1,996,579 | Johnstone | Apr. 2, 1935 |
| 1,837,803 | Weston | Dec. 22, 1931 |
| 1,414,622 | Carter | May 2, 1922 |